United States Patent
Arai et al.

(10) Patent No.: US 7,930,564 B2
(45) Date of Patent: Apr. 19, 2011

(54) SYSTEM AND METHOD FOR CONTROLLING PROCESSOR LOW POWER STATES

(75) Inventors: Susumu Arai, Portland, OR (US); Michael Walz, Vancouver, WA (US); Barnes Cooper, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 1259 days.

(21) Appl. No.: 11/496,944

(22) Filed: Jul. 31, 2006

(65) Prior Publication Data

US 2008/0028240 A1    Jan. 31, 2008

(51) Int. Cl.
   *G06F 1/00*    (2006.01)
(52) U.S. Cl. .................................................. 713/300
(58) Field of Classification Search .................. 713/320, 713/300; 706/12, 21
   See application file for complete search history.

(56) References Cited

U.S. PATENT DOCUMENTS

| | | | | |
|---|---|---|---|---|
| 4,593,367 A * | 6/1986 | Slack et al. | ...................... | 706/12 |
| 5,954,820 A * | 9/1999 | Hetzler | .......................... | 713/323 |
| 6,105,139 A * | 8/2000 | Dey et al. | ....................... | 713/300 |
| 6,516,307 B1 * | 2/2003 | Masuoka et al. | ................. | 706/12 |
| 6,845,456 B1 * | 1/2005 | Menezes et al. | ............... | 713/320 |
| 7,047,224 B1 * | 5/2006 | Neuneier et al. | ................ | 706/12 |
| 7,240,223 B2 * | 7/2007 | de Cesare et al. | ............. | 713/300 |
| 2003/0217296 A1 * | 11/2003 | Ma | ................. | 713/300 |
| 2004/0139356 A1 * | 7/2004 | Ma | ................. | 713/300 |
| 2007/0118631 A1 * | 5/2007 | Devarakonda et al. | ........ | 709/223 |
| 2007/0234088 A1 * | 10/2007 | Marshall et al. | .............. | 713/320 |
| 2007/0245163 A1 * | 10/2007 | Lu et al. | ........................ | 713/300 |
| 2007/0297327 A1 * | 12/2007 | Strom | ........................... | 370/230 |

OTHER PUBLICATIONS

Eui-Young Chung, Luca Benini and Giovanni De Micheli, Dynamic Power Management Using Adpative Learning Tree, International Conference on Computer Aided Design, Proceedings of the 1999 IEEE/ACM international conference on Computer-aided design, pp. 274-279.*

Yung-Hsiang Lu and Giovanni De Micheli, Comparing System-Level Power Management Policies, IEEE Design & Test, vol. 18, Issue 2 (Mar. 2001), pp. 10-19.*

* cited by examiner

*Primary Examiner* — Thomas Lee
*Assistant Examiner* — Brandon Kinsey
(74) *Attorney, Agent, or Firm* — Kacvinsky Daisak PLLC (57) ABSTRACT

A next idle state for a processor in a system may be determined based on a previous idle period and a previous idle state. The next idle state for the processor may also be determined based on times when interrupts are generated by devices in the system.

26 Claims, 9 Drawing Sheets

SYSTEM AND METHOD FOR CONTROLLING PROCESSOR LOW POWER STATES

FIELD OF THE INVENTION

The present invention relates to the field of computer systems, more particularly relating to methods and apparatuses for power management in computer systems.

BACKGROUND

A variety of techniques are known for reducing the power consumption in computer systems. For example, the Advanced Configuration and Power Interface (ACPI) Specification (Rev. 2.0a, Mar. 31, 2002) sets forth information about how to reduce the dynamic power consumption of portable and other computer systems. With respect to processors used in computer systems, different processor power states (or C states) are defined in the ACPI Specification. Mobile computer systems typically include implementation of a variety of C states (e.g., C0, C1, C2, and C3) to save power.

In the C0 state, the processor is considered to be in an active state, executing code and performing useful work. In any of the non-C0 states, the processor may be considered to be idle. For example, in the C1 state, the processor may be able to respond to snoop transactions, and wake up very quickly (also referred to as having low latency exit). The processor may progressively cycle through the other lower states such as C2 and C3 as necessary to save even more power. C2 is a stop grant or mobile "Quick Start" state, where typically clocks are gated off to a large portion of the processor die. The processor is able to service snoops in the C2 state. The C2 state also supports a fairly low latency exit to allow software to quickly resume execution. A processor in the C2 state may not return to the C0 state as quickly as a processor in the C1 state. However, a processor in the C2 state may not consume as much power as a processor in the C1 state.

C3 is a deep sleep state, where clocks may be gated either internally or externally to the entire processor. In the C3 state, the processor is unable to snoop bus master transactions. A processor in the C3 state may have higher latency exit to return to the C0 state as compared to a processor in the C2 or C1 state.

BRIEF DESCRIPTION OF THE DRAWINGS

The following drawings disclose various embodiments of the present invention for purposes of illustration only and are not intended to limit the scope of the invention.

DETAILED DESCRIPTION

In some embodiments, a system and method for determining a next processor idle state is disclosed. The next processor idle state may be determined based on a previous processor idle state and a prediction of the period that the processor may remain in the next idle state.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Computer System

Figure 1:
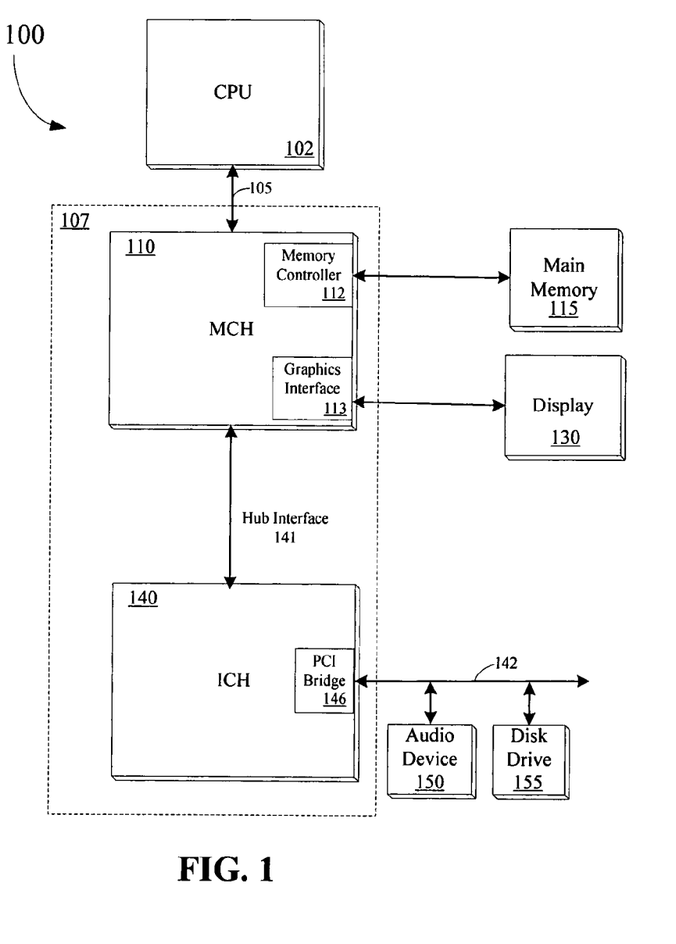
FIG. 1 is a block diagram illustrating an example of a computer system, in accordance with some embodiments.

FIG. 1 is a block diagram illustrating an example of a computer system, in accordance with an embodiment. Computer system 100 may include a central processing unit (CPU) 102 and may receive its power from an electrical outlet or a battery (not shown). The CPU 102 may include a cache memory (not shown). The CPU 102 and chipset 107 may be coupled to bus 105.

The chipset 107 may include a memory control hub (MCH) 110. The MCH 110 may include a memory controller 112 that is coupled to memory 115. The memory 115 may store data and sequences of instructions that are executed by the CPU 102 or any other processing devices included in the computer system 100. The MCH 110 may include a display controller 113. Display 130 may be coupled to the display controller 113. The chipset 107 may also include an input/output controller hub (ICH) 140. The ICH 140 is coupled with the MCH 110 via a hub interface 141. The ICH 140 provides an interface to input/output (I/O) devices within the computer system 100. The ICH 140 may include PCI bridge 146 that provides an interface to PCI bus 142. The PCI bridge 146 may provide a data path between the CPU 102 and peripheral devices. An audio device 150 and a disk drive 155 may be connected to the PCI bus 142. The disk drive 155 may include a storage media to store data and sequences of instructions that are executed by the CPU 102 or any other processing devices included in the computer system 100. Although not shown, other devices may also be connected to the PCI bus 142. For example, they may include network interface controller, communication device, keyboard, etc.

Idle State Determination Based on Past Busy Rate

Figure 2A:
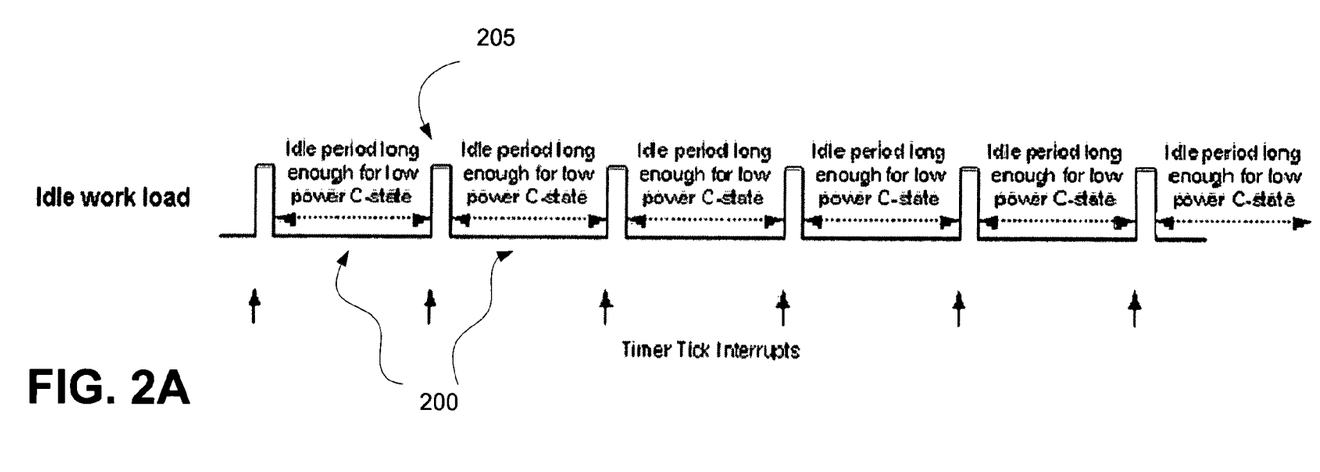
FIGS. 2A-2B include timing diagrams that illustrate examples of idle state determination based on past busy rate, in accordance with some embodiments.
Figure 2B:
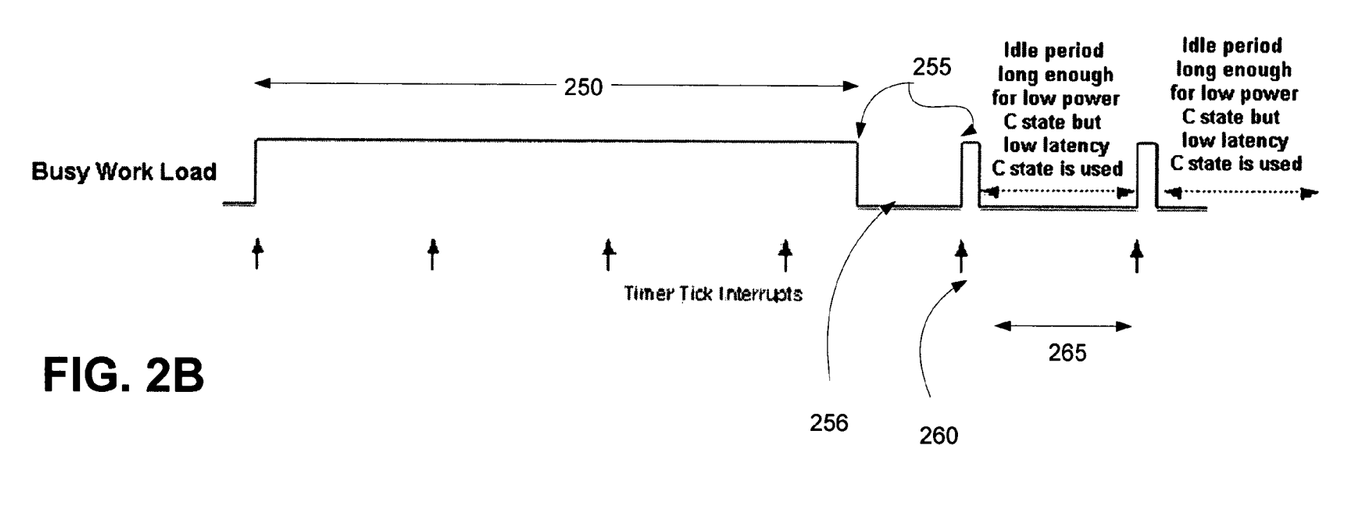

FIGS. 2A-2B include timing diagrams that illustrate examples of idle state determination based on past busy rate, in accordance with some embodiments. Because each of the idle C states has different characteristics (e.g., power consumption, latency exit, etc.) it would be desirable to place an idle processor in a correct idle state. For example, if the processor is incorrectly placed in the C1 state which has low latency exit to allow for quick return to the C0 state, and the subsequent idle period lasts longer than anticipated, then power is wasted because the processor could have been placed in a C2 or C3 state. Similarly, if the processor is incorrectly placed in the C3 state which has high latency exit but consumes less power, and the subsequent idle period lasts shorter than anticipated, then the high latency exit may cause a decrease in system performance because it would take longer than necessary to return to the C0 state.

The selection of the appropriate idle state is normally performed by an operating system (OS). Typically, the OS selects the idle state based on past busy rate. That is, if the past busy rate indicates that the processor was normally idle, a low power idle state (e.g., C2 or C3 state) may be used. If the past busy rate indicates that the processor was normally busy, then a low latency idle state (e.g., C1 state) may be used.

FIG. 2A illustrates an example situation when the processor is normally idle. In this example, a timer interrupt is generated periodically. The timings of the timer interrupts are represented by the vertical upward arrows. Each timer interrupt may cause the processor to change from an idle state (C1, C2 or C3) to the active state (C0). This is represented in the timing diagram by the change from an idle level 200 to a busy level 205. The period when the processor remains in the busy level may be referred to as the busy period. The processor may perform some work for a short period of time during the busy period and then may become idle. This is represented in the timing diagram by the change from the busy level 205 to the idle level 200. The period when the processor remains in the idle level may be referred to as the idle period. In this example, since the past busy rate indicates that the processor is normally idle, the OS may correctly determine that the processor is to be placed in a low power C state (e.g., C3) during the idle period.

FIG. 2B illustrates an example situation when the processor is transitioning from a busy level to an idle level after a long busy period. The timer interrupts are similar to those illustrated in FIG. 2A. In this example, the processor has just been busy for a long time during busy period 250 and is transitioning from the busy level 255 to the idle level 256. When a timer interrupt occurs at point 260, the processor may transition from the idle level 256 to a busy level 255. The process may remain busy for a short period before becoming idle again. Since the past busy rate of the processor indicates that it was busy during the long busy period 250, the OS may place the processor in a low latency C state (e.g., C1) during the idle period 265. Note that the length of time associated with this idle period 265 may be similar to those associated with the idle periods illustrated in FIG. 2A when the processor was placed in a low power state instead. In this example, the OS may select the incorrect idle state (e.g., C1) even though the processor may stay idle during the idle period 265 long enough that it should be placed in a low power or high latency C state (e.g., C3).

In a high interrupt rate environment, if the handling of the interrupt does not take much processing time, the average processor busy rate may stay relatively low, and the OS may select the low power C state for the processor during the idle period, as illustrated in FIG. 2A. However, if the OS selects the low power C state, and the idle period turns out to be short, then selecting a low power C state may increase power consumption rather than decrease it. This is because there is an associated entry/exit power penalty associated with the low power C state.

Determination of Next Idle State Based on Previous Idle Period

FIGS. 3A-3D illustrate examples of techniques that may be used to determine a next idle state, in accordance with some embodiments. For some embodiments, the determination of the next idle state for a processor may be based on a previous idle period and an associated previous idle state. The previous idle period may include the length of time that the processor stayed in the previous idle state prior to transitioning to an active state.

For some embodiments, each idle state may be associated with a threshold time. The threshold time for an idle state that is associated with lower power consumption (e.g., C3 state) may be longer than the threshold time for an idle state that is associated with low latency exit (e.g., C1 state). For example, a threshold time of more than 500 microseconds may be associated with the C3 state; a threshold time of more than 200 microseconds but less than or equal to 500 microseconds may be associated with the C2 state; and a threshold time less than or equal to 200 microseconds may be associated with the C1 state.

Figure 3A:
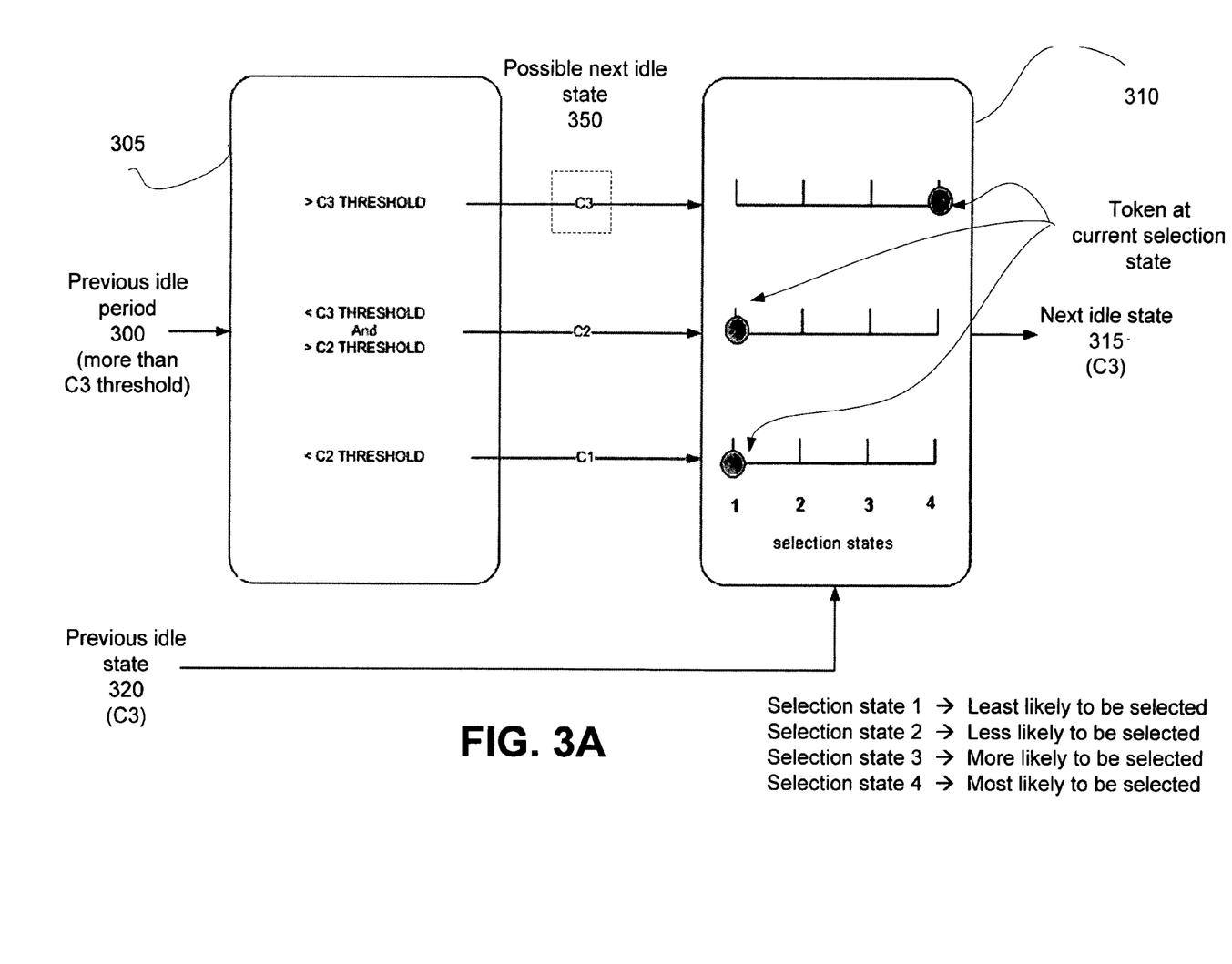
FIGS. 3A-3D illustrate examples of techniques that may be used to determine a next idle state, in accordance with some embodiments.

FIG. 3A illustrates one example of how a processor idle state is determined. For some embodiments, a previous idle period may be used in determining the next idle state. Previous idle period 300 may be used to compare with the threshold time associated with all of the available idle states. These comparisons are illustrated in block 305. If the previous idle period 300 is less than the threshold time associated with the C2 state, then the C1 state may be a possible next idle state, as illustrated in the bottom row of block 305. If the previous idle period 300 is less than the threshold time associated with the C3 state but longer than the threshold time associated with the C2 state, then the C2 state may be a possible next idle state, as illustrated in the middle row of block 305. If the previous idle period 300 is longer than the threshold time associated with the C3 state, then the C3 state may be a possible next idle state, as illustrated in the top row of block 305. In the current example, it is assumed that the previous idle period 300 is longer than the threshold time associated with the C3 state. As such, the possible next idle state 350 may be the C3 state, as indicated by the dotted square block. The possible next idle state 350 may be used to predict the next idle state.

For some embodiments, each idle state may be associated with a likelihood or probability that it may be selected as the next idle state. The likelihood of being selected may be referred to herein as a selection state. A higher selection state value may correspond to a higher probability that the idle state is selected as the next idle state. For example, the selection states may be defined as:

| Selection State: | Meaning: |
| --- | --- |
| 1 | Least likely to be selected |
| 2 | Less likely to be selected |
| 3 | More likely to be selected |
| 4 | Most likely to be selected |

A point in between the selection states "2" and "3" may be viewed as 50% likelihood that an idle state is either selected or not selected as a next idle state.

Initially, an idle state may be associated with any selection state. For example, each of the idle states C1 to C3 may initially be associated with the selection state "1". In block 310 of the current example, the selection state for the C1 state is set at "1". This is illustrated with a token placed at a position representing the selection state "1" for the C1 state. Similarly, a token is placed at a position representing the selection state "1" for the C2 state, and a token is placed at a position representing the selection state "4" for the C3 state.

For some embodiments, the selection states of the idle states may be adjusted based on a possible next idle state. For example, from block 305, when the possible next idle state 350 is determined as the C3 state, the selection state for the C3 state may be incremented to a next higher likelihood of being selected. In addition, the selection states for the C2 and C1 states may be decremented to a next lower likelihood of being selected. When a selection state associated with an idle state is at its highest likelihood of being selected (e.g., "4"), the selection state may not be incremented. Instead, it may remain the same or be decremented to a next lower likelihood of being selected (e.g., from "4" to "3"). Similarly, when a selection state associated with an idle state is at its lowest likelihood of being selected (e.g., "1") the selection state may not be decremented. Instead, it may remain the same or be incremented to a next higher likelihood of being selected (e.g., from "1" to "2"). The possible next idle state may be verified against its associated selection state. This is to determine if the possible next idle state may need to be adjusted before it can be used as the next idle state.

For some embodiments, when the selection state associated with a possible next idle state is more than 50% likelihood of being selected, the possible next idle state may be used as the next idle state.

For some embodiments, when the selection state associated with a possible next idle state is less than 50% likelihood of being selected, a previous idle state may also be used together with the selection state associated with the possible next idle state to determine the next idle state. Following is one technique that may be used to determine the next idle state using the previous idle state. When the selection state associated with the possible next idle state is at less than 50% likelihood of being selected (e.g., "2" or "1"), then if the possible next idle state is supposed to help save more power than the previous idle state (e.g., C3 saves more power than C1), the possible next idle state may be adjusted to a next higher power consumption idle state (e.g., from C3 to C2) and used as the next idle state; otherwise if the possible next idle state is supposed to help save less than the previous idle state (e.g., C1 saves less power than C2), then the possible next idle state may be adjusted to a next lower power consumption idle state (e.g., from C1 to C2) and used as the next idle state. The technique may also be described in the following pseudo-code example:

```
If (selection state of the possible next idle state) <50% then
  if (the possible next idle state saves more power than the previous idle
  state)
    then adjust the possible next idle state to next higher power
    consumption idle state
    else if (the possible next idle state saves less power than the previous
    idle state)
    then adjust the possible next idle state to next lower power
    consumption idle state
```

This technique of considering the previous idle state in determining the next idle state is further illustrated in the following examples related to FIGS. 3B, 3C and 3D. Referring to FIG. 3A, since the possible next idle state 350 is C3, the selection state of the C3 state may be incremented by one, and the selection states of the C2 and C1 states may be decremented by one. Since the selection state for the C3 state is already at its highest, the token for the C3 state may remain the same at selection state "4". Similarly, since the selection states for the C2 and C1 states are already at their lowest, the token for the each of the C2 and C1 states may remain the same at selection state "1". Since the selection state for the C3 state is at "4" and the possible next idle state 350 is the C3 state, the next idle state is therefore the C3 state.

The processor described in the example in FIG. 3A may remain in the C3 state for an idle period that is shorter than the threshold time associated with the C3 state. After exiting the C3 state, the processor may perform some work and then re-enter into an idle state. FIG. 3B illustrates another example of how a next processor idle state may be predicted. In this example, the previous idle period 301 is less than the C2 threshold time. As such, it may be determined from block 306 that the possible next idle state 351 is the C1 state, as indicated by the dotted square block.

Since the possible next idle state 351 determined from the block 306 is the C1 state, the selection state for the C1 state is examined. As illustrated in block 311, the selection state for the C1 state is incremented by one (from "1" to "2"). Since the C3 state is not the possible next state, the selection state of the C3 state is decremented by one (from "4" to "3"). The same decrement would normally need to be done to the C2 state. However, since the selection state of the C2 state is already at its lowest value of "1", the selection state of the C2 state may remain the same at "1".

In the current example, the selection state associated with the possible next idle state 351 is at "2" (less likely to be selected), and the possible next idle state 351 is the C1 state which may save less power than the previous idle state 321 (which was the C3 state). Therefore, the possible next idle state may be adjusted to a next lower power consumption idle state (e.g., C1 to C2) and used as the next idle state. Thus, the next idle state 316 is the C2 state, as illustrated in FIG. 3B.

Figure 3B:
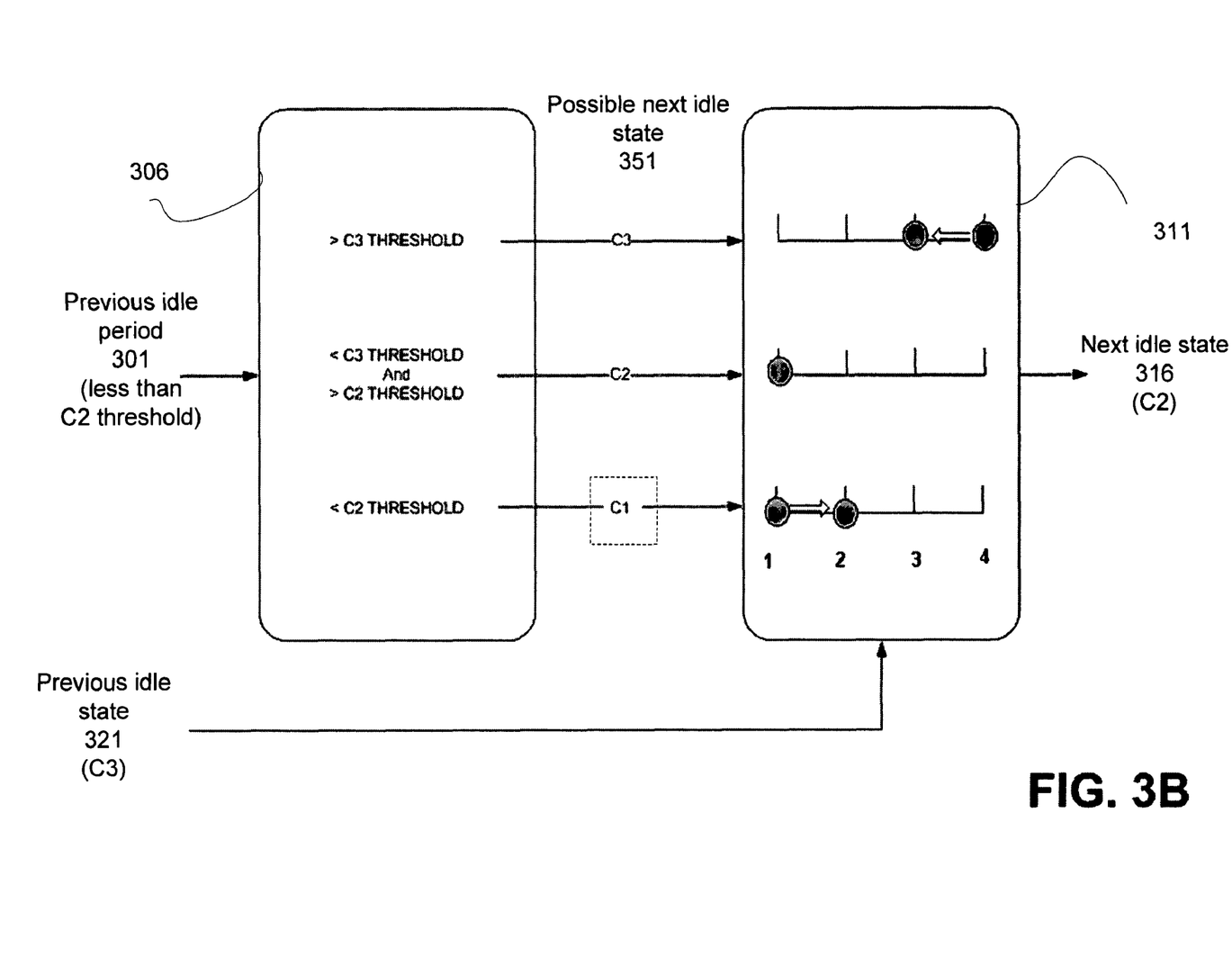

The processor described in the example in FIG. 3B may remain in the C2 state for an idle period that is shorter than the threshold time associated with the C2 state. After exiting the C2 state, the processor may perform some work and then re-enter into an idle state. FIG. 3C illustrates another example of how a next processor idle state may be determined. In this example, the previous idle period 302 is less than the C2 threshold time. As such, it may be determined from block 307 that the possible next idle state 352 is the C1 state, as indicated by the dotted square block.

Since the possible next idle state 352 determined from the block 307 is the C1 state, the selection state for the C1 state is examined. As illustrated in block 312, the selection state for the C1 state is incremented by one (from "2" to "3"). Since the C3 state is not the possible next idle state, the selection state of the C3 state is decremented by one (from "3" to "2"). The same decrement would normally need to be done to the C2 state. However, since the selection state of the C2 state is already at its lowest value of "1", the selection state of the C2 state may remain the same at "1".

In the current example, the selection state associated with the possible next idle state 352 (C1 state) is at "3" (more than likely to be selected), then the previous idle state 322 may not need to be considered, and the possible next idle state 352 may be used as the next idle state. Thus the next idle state 317 is the C1 state, as illustrated in FIG. 3C.

Figure 3C:
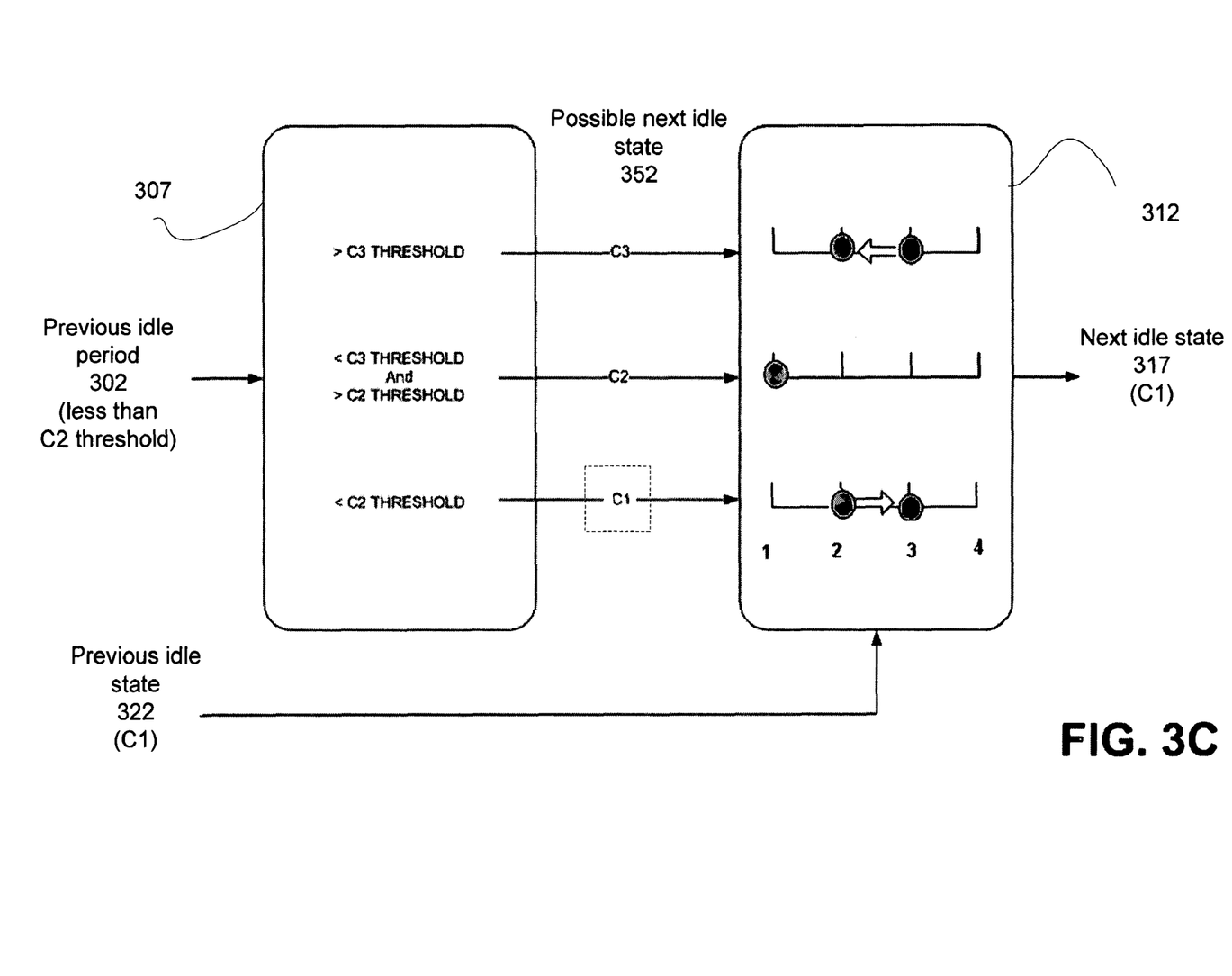
Figure 3D:
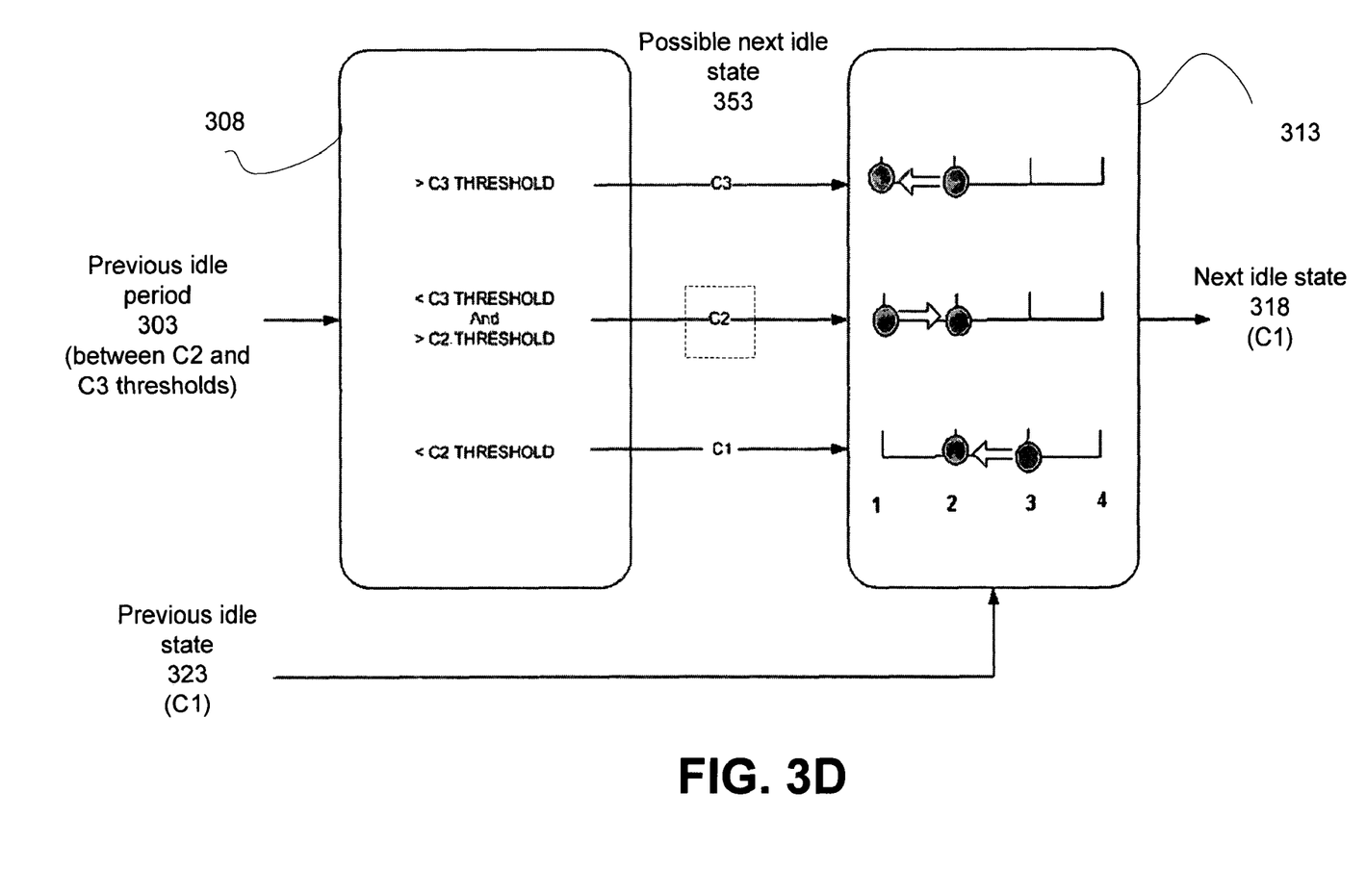

The processor described in the example in FIG. 3C may remain in the C1 state for an idle period that is longer than the threshold time associated with the C1 state. After exiting the C1 state, the processor may perform some work and then re-enter into an idle state. FIG. 3D illustrates another example of how a next processor idle state may be determined. In this example, the previous idle period 303 is between the threshold times for the C2 and C3 states. As such, it may be determined from block 308 that the possible next idle state 353 is the C2 state, as indicated by the dotted square block.

Since the possible next idle state 353 determined from the block 308 is the C2 state, the selection state for the C2 state is examined. As illustrated in block 313, the selection state for the C2 state is incremented by one (from "1" to "2"). Since the C3 state is not the possible next idle state, the selection state of the C3 state is decremented by one (from "2" to "1").

Similarly, since the C1 state is not the possible next idle state, the selection state of the C1 state is decremented by one (from "3" to "2").

In the current example, the selection state associated with the possible next idle state 353 (C2 state) is at "2" (less likely to be selected), and the possible next idle state 353 is the C2 state which may save more power than the previous idle state 323 (which was the C1 state). Therefore, the possible next idle state 353 may be adjusted to a next higher power consumption idle state (e.g., C2 to C1) and the adjusted possible next idle state may be used as the next idle state. Thus, the next idle state 318 is the C1 state, as illustrated in FIG. 3D.

Determination of Next Idle State Based on Device Driver Interrupts

Figure 4:
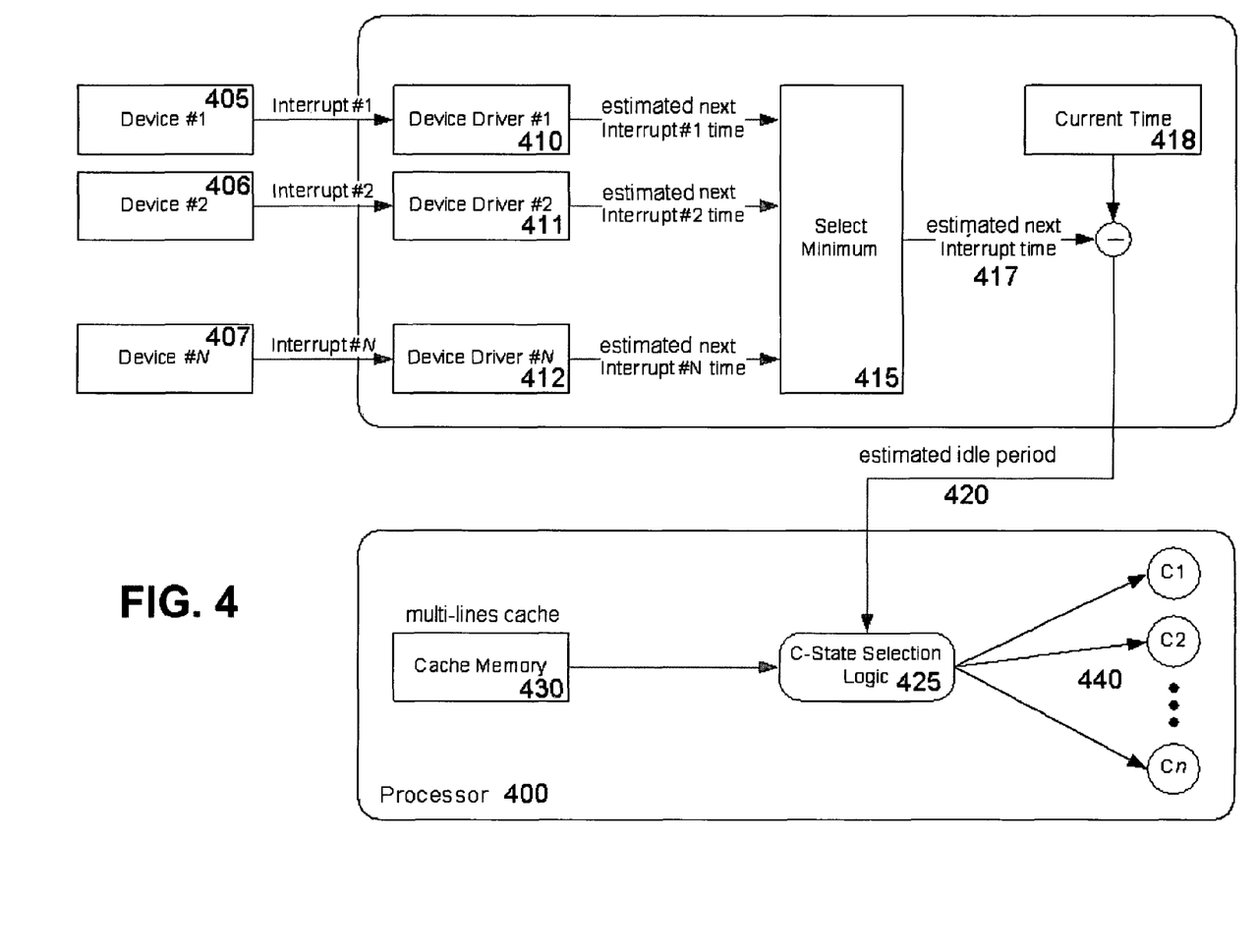
FIG. 4 is a block diagram that illustrates one example of techniques that may be used to determine a next idle state based on input from device drivers, in accordance with some embodiments.

For some embodiments, the selection of a next idle state may be performed using input from one or more device drivers. The input may include information about when an interrupt associated with a device driver is estimated to occur. FIG. 4 is a block diagram that illustrates one example of techniques that may be used to determine a next idle state based on input from device drivers, in accordance with some embodiments. Idle processor 400 may be awakened by an interrupt. At anytime, an interrupt may be generated by one of multiple devices 405-407. Each device may be associated with a device driver.

Interrupts generated by a device may be periodic. For some embodiments, a device driver may include logic to estimate when a next interrupt may be generated by an associated device. Any techniques may be used to estimate when the next interrupt may be generated. Referring to FIG. 4, device driver 410 may estimate a time when a next interrupt may be generated by device 405. Device drivers 411 and 412 may independently estimate a time when a next interrupt may be generated by devices 406 and 407, respectively. The estimated time may be referred to herein as a next interrupt time. The device drivers 410-412 may send their next interrupt time information to block 415. Operations performed in block 415 may include comparing all the next interrupt times received from the device drivers 410-412 and select a next interrupt time 417 that is closest to a current time.

This next interrupt time 417 may be subtracted from a current time 418, and the result may be used as an estimate of a next idle period 420. This operation may be performed by an OS, and the estimate of the next idle period 420 may be provided to the processor 400. When the processor 400 is to enter an idle state, the estimate of the next idle period 420 may be used by idle state selection logic 425 to determine which idle state 440 to enter. The idle state selection logic 425 may compare the estimate of the next idle period 420 with the threshold time associated with the different idle states. The threshold time is described above with FIGS. 3A-3D. The processor 400 may include cache 420 which may include multiple cache lines (not shown). The processor 400 may flush the cache lines when it is to enter an idle state. The processor 400 may be implemented with cache shrinking feature when it closes the cache lines while the processor 400 is idle to reduce further power consumption. In this situation, the cost of entering an idle state may be affected by how many cache lines are closed. For some embodiments, when the number of closed cache lines exceeds a limit, the threshold time associated with the different idle states may be lowered. For example, the closed cache lines limit may be set at one half or 50% of all the cache lines. The idle state selection logic 425 may use this information as a factor to select an idle state 440 that may reduce more power consumption. For example, the idle state selection logic 425 may select the C3 state instead of the C2 state when at least half of the cache lines are closed.

Process

Figure 5:
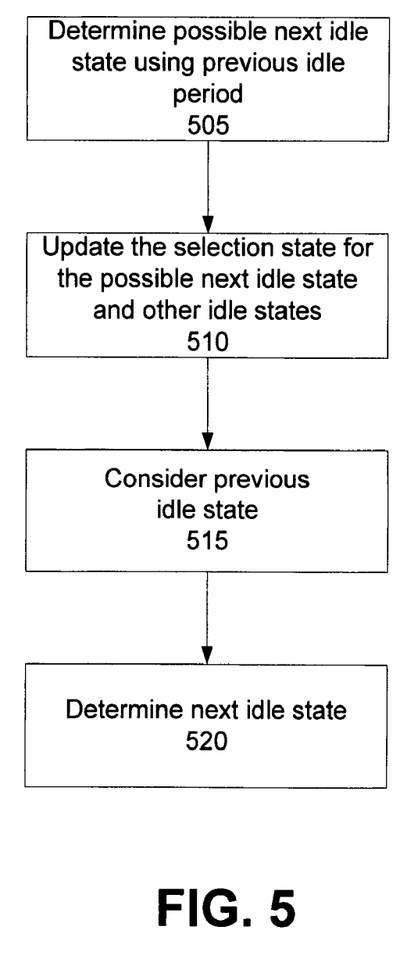
FIG. 5 is a flow diagram that illustrates one example of a process that may be used to determine a next idle state using a previous idle period, in accordance with some embodiments.

FIG. 5 is a flow diagram that illustrates one example of a process that may be used to determine a next idle state using a previous idle period, in accordance with some embodiments. The process may correspond with the operations described with FIGS. 3A-3D. At block 505, the possible next idle state is determined. This may include determining the previous idle period and comparing the previous idle period with the threshold times associated with each of the idle state. At block 510, the selection state of all of the idle states may be adjusted depending on the possible next idle state determined in block 505. The adjusted selection state of the possible next idle state may be verified to determine if the possible next idle state is the next idle state. At block 515, the previous idle state may be considered to determine if the possible next idle state need to be adjusted. At block 520, if the possible next idle state is adjusted in block 515, the adjusted possible next idle state may be used as the next idle state. If it is not adjusted in block 515, the possible next idle state from block 505 may be used as the next idle state.

Figure 6:
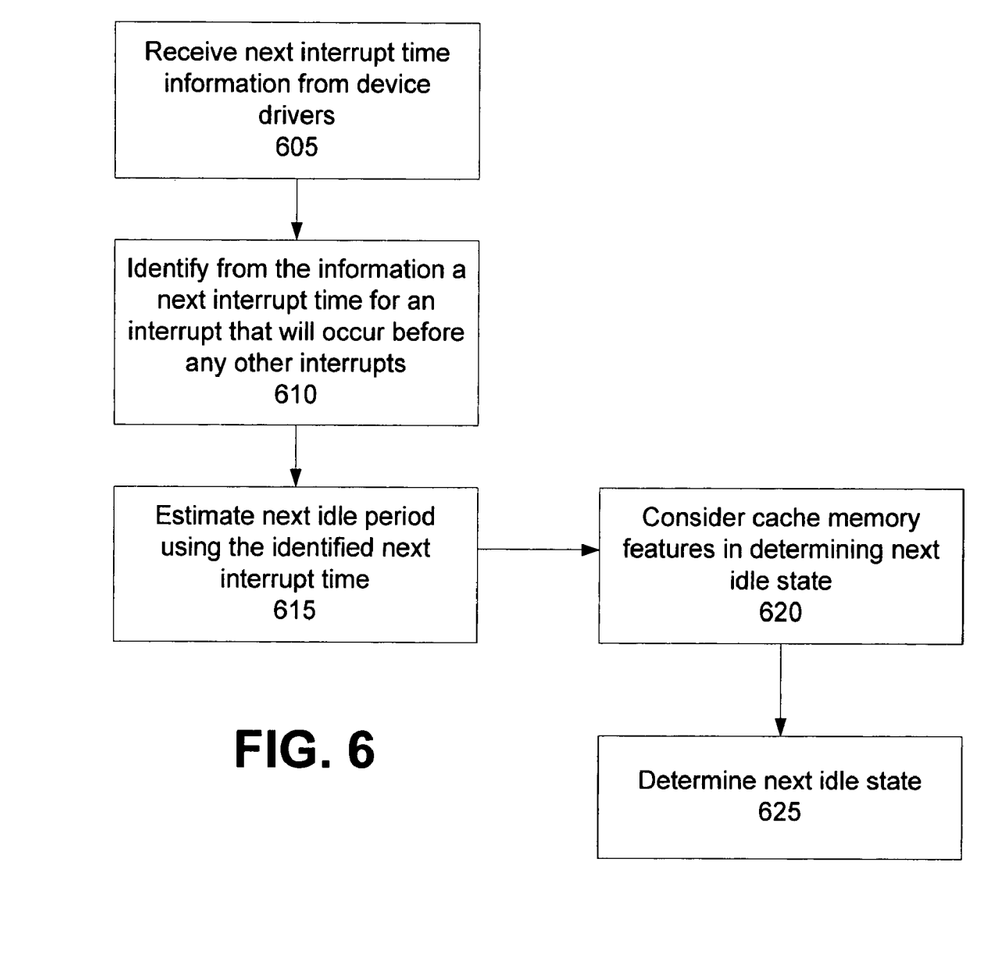
FIG. 6 is a flow diagram that illustrates one example of a process that may be used to determine a next idle state using a previous idle period, in accordance with some embodiments.

FIG. 6 is a flow diagram that illustrates one example of a process that may be used to determine a next idle state using information from device drivers, in accordance with some embodiments. The process may correspond with the operations described with FIG. 4. At block 605, next interrupt time information is received from device drivers in a system. Each device driver may be associated with a device that is capable of generating an interrupt to request attention of a processor. The interrupt may wake up an idle processor. At block 610, the next interrupt time information from the device drivers is evaluated to determine a next interrupt time associated with an interrupt that may be generated before any other interrupts. At block 615, the next interrupt time result from block 610 may be subtracted from a current time to determine an estimate of a next idle period. This estimate is based on anticipation that a device may generate an interrupt periodically. The estimate next idle period may be used to determine a possible next idle state. At block 620, when the processor implements cache memory with closed cache lines, the possible next idle state of the processor may be adjusted to save even more power (e.g., from C2 state to C3 state). At block 625, if the possible next idle state is adjusted in block 620, the adjusted possible next idle state may be used as the next idle state. If it is not adjusted in block 620, the possible next idle state from block 615 may be used as the next idle state.

The operations of these various techniques may be implemented by a processor in a computer system. The processor may execute sequences of computer program instructions that are stored in a memory that may be considered to be a machine-readable storage media. The memory may be random access memory, read only memory, a persistent storage memory, such as mass storage device or any combination of these devices. Execution of the sequences of instruction may cause the processor to perform operations according to the processes described in FIGS. 5-6, for example.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
   determining a possible next idle state for a processor by comparing a previous idle period of the processor and threshold times associated with available idle states; and
   verifying the possible next idle state against a probability that the possible next idle state is to be selected as a next idle state, wherein each of the available idle states is associated with a probability that it is selected as the next idle state.

2. The method of claim 1, wherein the probability that an idle state is selected as the next idle state is adjusted after the possible next idle state is determined.

3. The method of claim 2, wherein when a first idle state is determined to be the possible next idle state, the probability that the first idle state is selected as the next idle state is increased.

4. The method of claim 3, wherein when a second idle state is determined not to be the possible next idle state, the probability that the second idle state is selected as the next idle state is decreased.

5. The method of claim 4, wherein when the probability that the first idle state is selected is above a threshold, the next idle state is the first idle state.

6. The method of claim 5, wherein the threshold is 50 percent.

7. The method of claim 5, wherein when the probability that the first idle state is selected is below a threshold, the next idle state is determined by comparing the first idle state with a previous idle state.

8. The method of claim 7, wherein when the first idle state is to consume more power than the previous idle state, the next idle state is an idle state that is to consume less power than the first idle state.

9. The method of claim 7, wherein when the first idle state is to consume less power than the previous idle state, the next idle state is an idle state that is to consume more power than the first idle state.

10. A system, comprising:
    logic operative to determine a possible next idle state using a comparison of a previous idle period and threshold times associated with available idle states;
    logic operative to adjust selection states associated with available idle states including the possible next idle state, wherein a selection state corresponds to a probability that an associated idle state is selected as a next idle state, wherein each of the available idle states is associated with a probability that it is selected as the next idle state;
    logic operative to determine the next idle state based on the possible next idle state and the adjusted selection state associated with the possible next idle state.

11. The system of claim 10, wherein logic operative to adjust the selection states associated with the available idle states comprises:
    logic operative to determine whether to keep a selection state at a current level, to increase the selection state to a next higher level, or to decrease the selection state to a next lower level.

12. The system of claim 10, wherein when the selection state associated with the possible next idle state corresponds to a probability of more than 50 percent, the possible next idle state is selected as the next idle state.

13. The system of claim 10, wherein when the selection state associated with the possible next idle state corresponds to a probability of less than 50 percent, a previous idle state is used to determine the next idle state.

14. An article of manufacture contained on a tangible embodied computer readable medium including data that, when accessed by a machine, cause the machine to performs operations comprising:
    determining a possible next idle state for a processor based on a comparison of a previous idle period of the processor and threshold times associated with available idle states; and
    determining a next idle state based on the possible next idle state and a probability that the possible next idle state is to be selected as a next idle state; and
    verifying the possible next idle state against a probability that the possible next idle state is to be selected as a next idle state, wherein there are one or more idle states, and wherein each of the idle states is associated with a probability that it is selected as the next idle state.

15. The article of manufacture of claim 14, wherein the probability that an idle state is selected as the next idle state is adjusted after the possible next idle state is determined.

16. The article of manufacture of claim 15,
    wherein when a first idle state is determined to be the possible next idle state, the probability that the first idle state is selected as the next idle state is increased, and
    wherein when a second idle state is determined not to be the possible next idle state, the probability that the second idle state is selected as the next idle state is decreased.

17. The article of manufacture of claim 16, wherein when the probability that the first idle state is selected is above a threshold, the next idle state is the first idle state.

18. The article of manufacture of claim 16, wherein when the probability that the first idle state is selected is below the threshold, the next idle state is determined by comparing the first idle state with a previous idle state.

19. The article of manufacture of claim 18, wherein when the first idle state is to consume more power than the previous idle state, the next idle state is an idle state that is to consume less power than the first idle state; and wherein when the first idle state is to consume less power than the previous idle state, the next idle state is an idle state that is to consume more power than the first idle state.

20. A method, comprising:
    receiving from device drivers estimated times when next interrupts are to be generated by devices associated with the device drivers;
    determining time difference between a current time and an estimated time that is closest to the current time;
    determining a next idle period using the time difference;
    determining a next idle state for a processor based on the next idle period and a comparison with threshold times associated with idle states; and
    verifying the next idle state against a probability that the next idle state is to be selected as a next idle state, wherein each of the available idle states is associated with a probability that it is selected as the next idle state.

21. The method of claim 20, wherein when the processor is configured with a multi-line cache memory, the next idle state is further determined based on a number of closed cache lines.

22. The method of claim 21, wherein when the number of closed cache lines exceed a limit, the threshold times associated with the idle states are lowered.

23. An article of manufacture contained on a tangible embodied computer readable medium including data that, when accessed by a machine, cause the machine to performs operations comprising:

receiving from device drivers estimated times when next interrupts are to be generated by devices associated with the device drivers;

determining a next idle period using a time difference between a current time and an estimated time that is closest to the current time;

determining a next idle state for a processor based on the next idle period and a comparison with threshold times associated with idle states; and verifying the next idle state against a probability that the next idle state is to be selected as a next idle state, wherein each of the available idle states is associated with a probability that it is selected as the next idle state.

24. The article of manufacture of claim 23, wherein when the processor is configured with a multi-line cache memory, the threshold times associated with the idle states are reduced when a number of closed cache lines exceed a limit.

25. A system, comprising:
logic to estimate next interrupt times associated with multiple devices, each device configured to generate an interrupt periodically;

logic to determine a next idle state for a processor based on a time difference between a current time and a next interrupt time closest to the current time and to compare the time difference with threshold times associated with available idle states; and logic to verify the next idle state against a probability that the next idle state is to be selected as a next idle state, wherein each of the available idle states is associated with a probability that it is selected as the next idle state.

26. The system of claim 25, wherein the threshold times associated with the available idle states are lowered when a number of closed cache lines of a cache associated with the processor exceed a limit.

* * * * *